United States Patent [19]

Nappi et al.

[11] Patent Number: 5,751,260
[45] Date of Patent: May 12, 1998

[54] SENSORY INTEGRATED DATA INTERFACE

[75] Inventors: Bruce Nappi, West Newton; William Schroeder, Wayland, both of Mass.; James E. Miller, Middletown, R.I.

[73] Assignee: The United States of America as represented by the Secretary of the Navy, Washington, D.C.

[21] Appl. No.: 416,591

[22] Filed: Apr. 3, 1995

Related U.S. Application Data

[63] Continuation of Ser. No. 820,284, Jan. 10, 1992, abandoned.
[51] Int. Cl.$^6$ .................... G09G 5/00; G06F 3/00
[52] U.S. Cl. ................ 345/8; 345/158; 340/825.19
[58] Field of Search ................... 340/705–707, 340/709, 825.19; 351/210; 381/43; 358/103, 104; 382/2; 434/112; 345/8, 156–158, 169

[56] References Cited

U.S. PATENT DOCUMENTS

| | | | |
|---|---|---|---|
| 4,028,725 | 6/1977 | Lewis | 385/104 |
| 4,034,401 | 7/1977 | Mann | 351/210 |
| 4,109,145 | 8/1978 | Graf | 340/825.19 |
| 4,641,349 | 2/1987 | Flom et al. | 382/2 |
| 4,659,197 | 4/1987 | Weinblatt | 351/210 |
| 4,702,575 | 10/1987 | Breglia | 351/210 |
| 4,768,088 | 8/1988 | Ando | 351/210 |
| 4,852,988 | 8/1989 | Velez et al. | 351/210 |
| 4,884,219 | 11/1989 | Waldren | 364/514 |
| 4,916,441 | 4/1990 | Gombrich | 345/169 |
| 4,934,773 | 6/1990 | Becker | 350/6.6 |
| 4,961,177 | 10/1990 | Uchara | 381/43 |
| 4,973,149 | 11/1990 | Hutchinson | 351/210 |
| 4,984,179 | 1/1991 | Waldern | 364/514 |
| 4,993,068 | 2/1991 | Piosenka et al. | 382/2 |
| 5,003,300 | 3/1991 | Wells | 340/705 |
| 5,133,011 | 7/1992 | McKiel, Jr. | 381/43 |

FOREIGN PATENT DOCUMENTS

| | | |
|---|---|---|
| 353459A1 | 2/1990 | European Pat. Off. . |
| 454363A2 | 10/1991 | European Pat. Off. . |
| WO 87/07497 | 12/1987 | WIPO . |
| WO 91/17522 | 11/1991 | WIPO . |

OTHER PUBLICATIONS

M.L. Wolbarsht et al., "Testing Visual Capabilities for Medical Surveillance or to Ensure Job Fitness", Journal of Occupational Medicine, vol. 27, No. 12, Dec. 1985, pp. 897–901.
Park Engineering Associates, "CompCap —Wearable Computer Systems", date is prior to Jan. 10, 1992.
R.J. Leigh et al., "The Diagnostic Value of Abnormal Eye Movements: A Pathophysiological Approach", The John Hopkins Medical Journal, vol. 151, pp. 122–135, (1982).
J.D. Foley et al., "The Art of Natural Graphic Man–Machine Conversation", Proceedings of the IEEE, vol. 62, No. 4, Apr. 1974, pp. 462–471.

(List continued on next page.)

Primary Examiner—Jeffery Brier
Attorney, Agent, or Firm—Michael J. McGowan; Prithvi C. Lall; Michael F. Oglo

[57] ABSTRACT

A system for interfacing between a user and a computer includes a microvideo display monitor, which may be mounted in a position which is substantially fixed relative to a given eye of the user, and a video input device which obtains an image of the given eye. The video input device is maintained in a fixed spatial relationship with the microvideo display monitor. From the image of the user's eye obtained by the video input device, the location on the display on which this eye is focused may be determined. A computer which controls the generation of selected displays on the microvideo display monitor responds to the eye focus location to perform predetermined functions. A voice or speech recognition unit may also be used to provide inputs to the computer. The computer may then perform predetermined functions in response to any combination of speech, and eye location data. The system may also be used for identification of the user and to determine whether the user is impaired.

14 Claims, 4 Drawing Sheets

OTHER PUBLICATIONS

J. Borah, Helmet Mounted Eye Tracking for Virtual Panoramic Display Systems –vol. I: Review of Current Eye Movement Measurement Technology, Aug. 1989, Harry G. Armstrong Aerospace Medical Research Laboratory, Document AAMRL–TR–89–019.

W. Dziwak, "Preliminary Evaluation of the Oculometer and Speech Interface System (Oasis) For Fire Control", U.S. Army Armament Research, Development & Engineering Center, Contractor Report ARFSD–CR–89020, Final Report of Contract DAAA, 21–87–C–0236.

J.G. May et al., "Eye Movements As An Index of Mental Workload", Air Force Office of Scientific Research, Final Report Contract F49620–85–C–0121 Phase I, Topic # 174.

M. Fahle, "Limits of Precision for Human Eye Motor Control", MIT AI Lab Memo. No. 1209, Nov. 1989.

B. Hofferberth et al., "Saccadic eye movements in demented patients—a tool for therapy control?", J. Neural Transm [P–D Sect] (1989) 1:77.

Y. Goussard et al., "A New Quantitative Indicator of Visual Fatigue", IEEE Transactions on Biomedical Engineering, vol. BME–34 No. 1, Jan. 1987, pp. 23–39.

E. Kowler et al., "Smooth Eye Movements as Indicators of Selective Attention", Chapter 15 in Attention and Performance XI, edited by Posner et al. (Hillsdale, New Jersey: Lawrence Erlbaum, 1985).

G.H. Robinson et al., "Dynamics of the Eye and Head During an Element of Visual Search", Ergonomics, 1976, vol. 19, No. 6, 691–709.

L. Cipparrone et al., "Electro–oculographic routine examination in Parkinson's disease", Acta Neurol Scand., 1988: 77: 6–11.

J. Levett et al., "Effects of Alcohol on Retinal Potentials, Eye Movements, Accommodation, and the Pupillary Light Reflex", Neurotoxicity of the Visual System, W.H. Merigan et al., eds. Raven Press, New York, 1980 pp. 87–100.

R.J.K. Jacob, "The Use of Eye Movements in Human–Computer Interaction Techniques: What You Look At is What You Get", ACM Transactions on Information Systems, vol. 9, No. 3, Apr. 1991, pp. 152–169.

T.E. Hutchinson et al., "Human–Computer Interaction Using Eye–Gaze Input", IEEE Transactions on Systems, Man and Cybernetics, vol. 19, No. 6, Nov./Dec. 1989, pp. 1527–1534.

R.J.K. Jacob, "What You Look At is What You Get: Eye Movement–Based Interaction Techniques", CHI 90 Proceedings (published by the ACM), Apr. 1990, pp. 11–18.

C. Ware et al., "An Evaluation of an Eye Tracker as a Device for Computer Input", Proceeding of CHI & GI '87 (Published by the ACM), pp. 183–188.

E. Peli, "Visual issues in the use of a head–mounted monocular display", Optical Engineering, Aug. 1990, vol. 29, No. 8, pp. 883–892.

C.C. Smyth et al., "Comparison of Oculometer and Head–Fixed Reticle with Voice or Switch and Touch Panel for Data Entry on a Generic Tactical Air Combat Display", Aug. 1989, U.S. Army Human Engineering Laboratory, Technical Memorandum, 21–89.

J.G. Rogers, "Of Mice and Touchpanels: The Human Factors", California State University, pp. 480–485.

F.A. Glenn III, et al., "Eye–Voice–Controlled Interface", Proceedings of the Human Factors Society–30th Annual Meeting, 1986, pp. 322–326.

A.N. Griffiths et al., "Saccadic eye movement analysis as a measure of drug effects on human psychomotor performance", Br. J. clin. Pharmac. (1984), 18, 73S–82S.

J.M. Gibson et al., "Ocular motor and manual tracking in Parkinson's disease and the effect of treatment", Journal of Neurology, Neurosurgery, and Psychiatry 1987; 50: 853–860.

Merchant, J.; Morrisette, R., Porterfield, J.L., "Remote Measurement of Eye Direction Allowing Subject Motion over One Cubic Foot of Space", IEEE Transactions on Biomedical Engineering, vol. BME–21, No. 4, Jul. 1974.

Smyth, C.; Domminessy, M.E., "Comparison of Oculometer and Head–Fixed Reticle with Voice or Switch and Touch Panel for Data Entry on a Generic Tactical Air Combat Display", Technical Memorandum 21–89, U.S. Army Human Engineering Laboratory AMC MS Code 612716.H700011, Aug. 1989.

Frederickson, E.W.; Lindquist, J.W.; Lemen, J.B., "An Analysis of Electronic Aids to Maintenance (EAM) for the Light Helicopter Family (LHX)", ARI Research Note 89–09, Jan. 1989, United States Army Research Institute for the Behavioral and Socal Sciences.

Starks, M., "Steroscopic Video & the Quest for Virtual Reality: An Annotated Bibliography of Selected Topics", in Proc. SPIE–Stereoscopic Displays and Applications II, vol. 1457.

"Eye Movement Monitored Research Laboratory," brochure, copyrighted 1989, from ISCAN, Inc., Cambridge, MA.

"Iscan Model RK–416PC Pupil Tracking System Circuit Board," data sheet (undated) from ISCAN, Inc., Cambridge, MA.

Eye Movement Monitoring and Pupillometry Systems, 1988–89 Catalog from ISCAN, Inc., Cambridge, MA.

Brochures, Press Releases and Price List for Dragon Dictate –30K from Dragon Systems, Inc., Newton, MA. 1992.

Brochure (undated) on Fourward Technologies Eyetracker.

"Eyehead Technical Description" from Applied Science Laboratories (May 1, 1991).

Series 4000 Specifications (undated) from Applied Science Laboratories.

"Eye Tracking Systems Handbook" (undated) from Applied Science Laboratories.

5,751,260

SENSORY INTEGRATED DATA INTERFACE

This application is a continuation of application Ser. No. 07/820,284, filed 10 Jan. 1992, now abandoned.

FIELD OF THE INVENTION

The present invention is related to man-machine interfaces. More particularly, the present invention is related to interfaces between a computer operator and a computer. The present invention is particularly applicable for providing a hands-free input interface to portable computers.

BACKGROUND OF THE INVENTION

Although computer technology has advanced significantly since its first inception, the development of the interface between a human user and the computer has been relatively stagnant.

Most advanced man-machine interfaces are limited to keyboard, mouse, or trackball control in connection with some advanced graphics packages on large area video displays. Such interfaces are sometimes impractical in applications where portable and mobile data entry stations are required. The interfaces are particularly problematic where work surfaces are limited or where hands-free operation of a computer is required. For example, maintenance of in-service aircraft is often done on the flight line, in engine compartments or wiring panels. The lack of panel and work surface space in these areas restricts the ability of an operator to use keyboards and large computer displays.

Current data interfaces also fail to make full use of all types of means for providing input to a computer beyond touch at a keyboard or other device. Though many types of inputs are known and used, they have yet to be collectively and successfully integrated into a data interface.

Accordingly, it is an object of the present invention to provide an improved man-machine data interface.

SUMMARY OF THE INVENTION

To accomplish the foregoing and other objects of the invention, there is provided a system for interfacing between a user and a computer which includes a microvideo display monitor and a device for mounting this monitor in a position which is substantially fixed relative to a given eye of the user. A video input device is used to obtain an image of the given eye. This device is maintained in a fixed spatial relationship with the microvideo display monitor after it has been calibrated with this display.

With such a system, a microvideo display may be used to generate selected displays under control of the computer. From the image obtained of the given eye of the user, an output to the computer is provided, which output is indicative of the location on the monitor where the given eye is focused. Such a function is also known as an eyetracker. The eyetracker may be used by the computer to control a cursor location on the microvideo display monitor. The computer also may perform other predetermined functions in response to the eyetracker and the location on the monitor where the given eye is focused.

The system of the present invention may also include an audio receiver, such as a microphone, to receive inputs from the user to the computer and may generate inputs to the computer which are interpretations of the audio signals received from the user. The inputs generated as interpretations of the audio signals from the user may include commands generated by a speech recognizer to instruct the computer to perform different functions for different recognized speech.

The computer may also perform functions in response to both recognized speech and the location on the display on which the given eye of the user is focused. Even more functions may be performed in response to the location on which the given eye is focused, and the duration of time during which the eye is focused on that location.

The system of the present invention may also be used to perform identification of the user by sensing personal characteristics from the speech recognizer and the eyetracker, for example. Similarly, such characteristics could also be used to determine whether the user is impaired.

In another aspect of the present invention, the computer is at a location remote from the user, and the system includes a transceiver which allows bilateral communication with the computer.

Other aspects and advantages of the present invention will be more completely understood in view of the detailed description below, taken in conjunction with the accompanying drawing.

DETAILED DESCRIPTION

Figure 1:
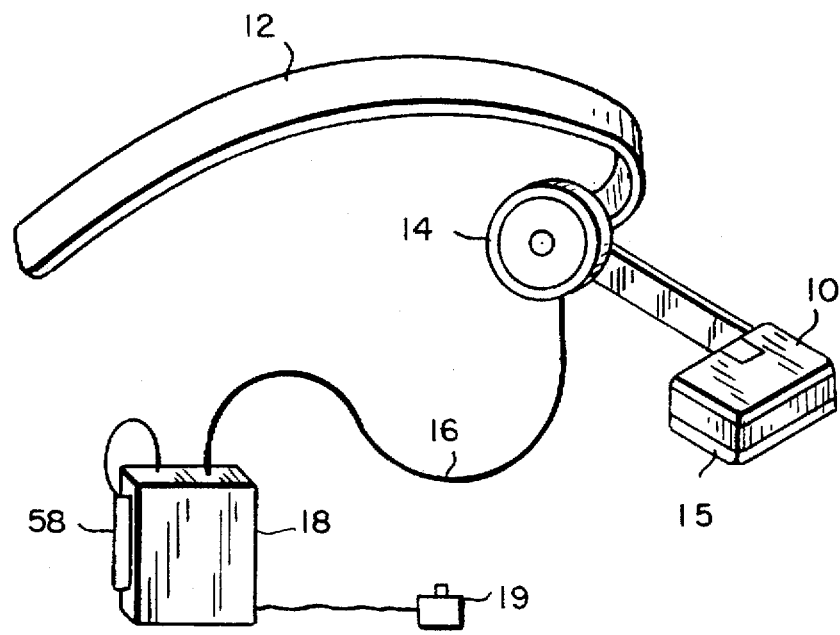
FIG. 1 is an isometric view of a data interface in accordance with the present invention.

FIG. 1 illustrates a preferred embodiment of a data interface in accordance with the present invention. In FIG. 1, an integrated microvideo display and eyetracker unit 10 is attached to a headband 12 which may be worn by a user. Many types of headbands or other mounting devices may be used to hold the unit 10 in a position which is fixed relative to a given eye of the user. An eyetracker determines the location on a video display at which the computer operator is looking and controls a cursor on the display to coincide with the determined location. The integration of an eyetracker with a microvideo display as in unit 10, provides hands-free control of the cursor location on the microvideo display. Moreover, the microvideo display is not bulky and does not require substantial counterspace or work area. A communication device 16, e.g. a wire or cable, is provided to transmit information between the integrated microvideo display and eyetracker unit 10 to a computer 18 (not shown to scale). The computer 18 performs the various computations required by these devices to move the cursor.

Figure 6:
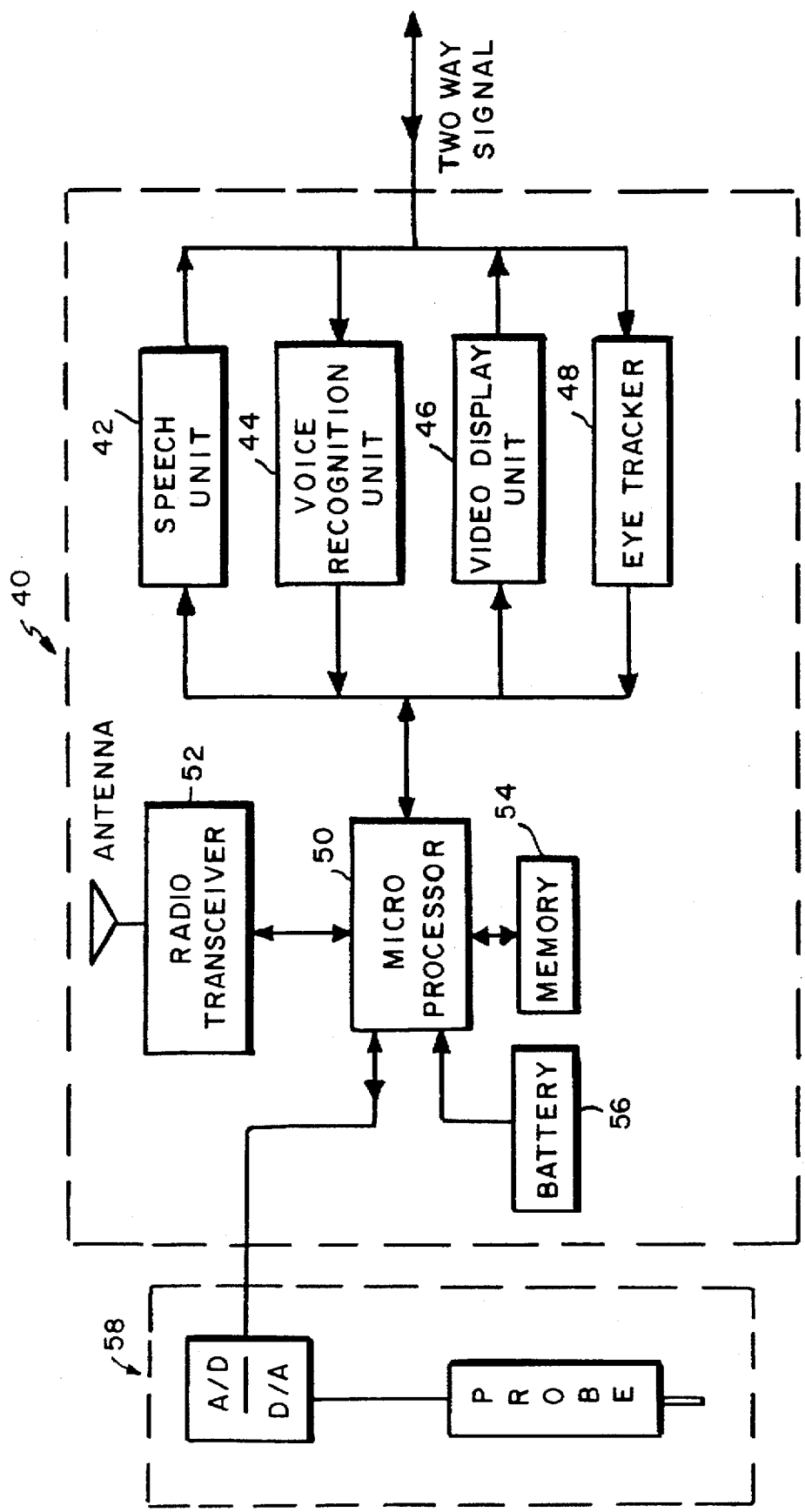
FIG. 6 is a schematic block diagram of a portable unit for use in connection with the present invention.

An interface such as in FIG. 1 allows complete portable computer interaction without a keyboard or tabletop monitor. The computer 18 may be portable, and carried, for instance, using a backpack. To minimize the amount of computer hardware which needs to be transported, the computer 18 may include a portable unit including the hardware elements for the videodisplay and eye tracking hardware which communicates with a main computer which can be considered a remote base station. This embodiment will be described in more detail below in connection with FIG. 6.

Figure 2:
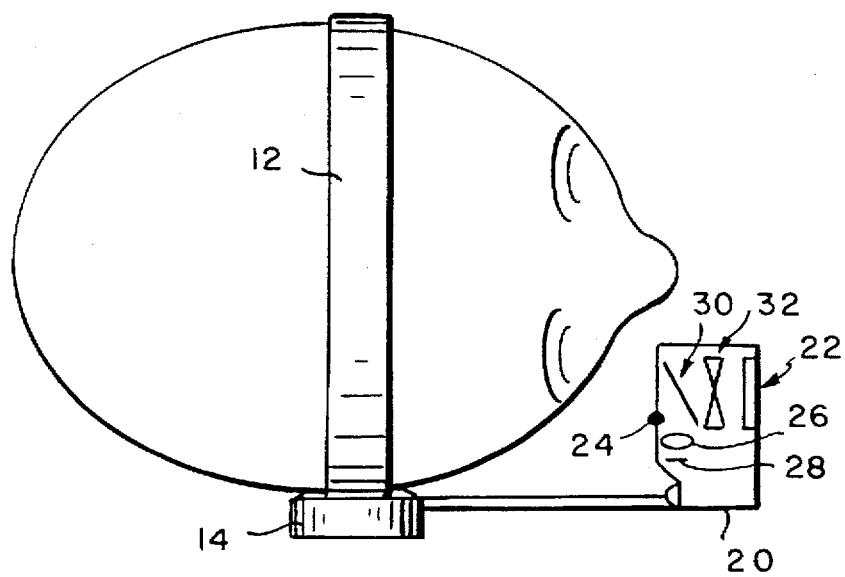
FIG. 2 is a top, plan, partially cross-sectional view of the embodiment of FIG. 1.

A description of the integrated microvideo display and eyetracker unit 10 will now be provided. Referring to FIG. 2, the integrated unit 10 includes a housing 20 which supports a microvideo display 22 and hardware for an eyetracker unit in a fixed spatial relationship so as to maintain a fixed relationship of the display coordinate system and the eyetracking coordinate system. The eyetracker hardware obtains an image of the eye and provides a signal which is indicative of this image. One embodiment includes an infrared illuminator 24 which illuminates the eye, and a lens 26 for focusing reflections from the eye onto a video chip 28. The video chip 28 is a photodiode array similar to the light-sensitive portions of common cameras. The photodiode array either is infra-red sensitive or is provided with an infra-red transmitting filter. The video chip 28 sends its signals through the communication device 16 to the computer 18 for processing to determine the eye location relative to objects on the microvideo display 22. If necessary, the housing also supports a dichroic mirror 30 which allows the operator to look directly at the microvideo display 22 without interference from the eyetracking hardware. The housing 20 may also support a lens 32 between the dichroic mirror 30 and microvideo display 22 in order to enhance the picture obtained from the microvideo display 22.

Microvideo displays, such as display 22 in FIG. 2, and eyetracking hardware, for instance, elements 24, 26 and 28 in FIG. 2, are well-known, commercially-available devices. However, their combination as a computer interface was not known.

An eyetracker suitable for use in the present invention is available from Iscan, Inc. of Cambridge, Mass. The product includes a circuit board for performing high speed image processing, eyetracking hardware which may be integrated such as in unit 10 of FIG. 1 and a computer application program to be run by a host computer such as computer 18. The Iscan eyetracker may be connected to an IBM-type personal computer running the DOS operating system. Such a computer could be used as the computer 18 of FIG. 1. The Iscan system is designed to be connected to a video display unit. The application program is provided to control the cursor location on the video display in response to the eyetracker and to calibrate the eyetracker with the X-Y coordinate system of the display unit. Calibration includes the steps of displaying two or more points on the display unit and instructing the operator to look at the points. Until the present invention, this system has not successfully been adapted for use with a microvideo display.

Microvideo displays which are suitable for use with the present invention are well known in the art. An example of such a product which is commercially available is the PRIVATE EYE, manufactured by Reflection Technology, Inc. of Waltham, Mass. This product is described in U.S. Pat. Nos. 4,902,083 and 4,934,773. A similar device is also described in U.S. Pat. No. 5,003,300. Such devices are often used on videocam displays.

The microvideo display and eyetracker may be integrated in a unit 10 as shown in FIG. 1, or may be separate but having a fixed relationship therebetween after calibration. A description of the computer 18 to which the eyetracker and microvideo display unit 10 are connected will now be provided.

The computer 18 may be any type of general purpose computer, but preferably a portable personal computer or a specialized hardware package. Such products are well-known and commercially-available, such as the IBM-PC AT.

Many other types of computers could also be used. The commercially available eyetracker and microvideo display units, as described above, or similar customized devices, often have hardware units which may be connected to the computer 18 and include application programs to be run on the computer 18. Although the individual control elements (i.e., their application programs) for the microvideo display and eyetracker are well-known, they may not be compatible with each other when running simultaneously on the computer 18. Thus, in some cases, special application programs need to be provided to make the commercial application programs compatible. In some cases, the commercial programs may be rewritten. Such rewriting steps are well within the ordinary skill of a programmer, and merely involve standard debugging practices.

On computer 18, the application programs for the eyetracker and microvideo display operate in a manner similar to standard peripheral device drivers, such as a mouse, keyboard, printer or video display. The eyetracker, acting as in input device, is analogous to a mouse. Thus, it provides commands, known as interrupts, to computer 18. The computer 18 responds to these interrupts to change the cursor location on the video display. Sometimes, additional input besides cursor location and movement is used to indicate that an item displayed on the microvideo display is selected. Using a button, such as button 19 in FIG. 1, or other type of input from a keyboard or mouse is a common practice for such selection and may also be used in combination with the eyetracker and videodisplay unit. Such a combination would be made in a manner substantially similar to the combination of a mouse unit with a button.

The selection of a displayed object more advantageously may be provided in other ways in accordance with the present invention. For instance, the attention span of an operator on a specific displayed item may be determined by an eyetracker. The computer may determine the duration of time during which the user is focused on a given location. After a predetermined amount of time, the computer could perform a function. For example, if the computer display included menu items, a user could select a menu item simply by focusing his attention on that item for the predetermined amount of time. In some cases, however, time delay should not be used to cause the computer to perform a function, especially when undesirable, or irreversible results may occur due to that function.

Audio input and output may also be used in connection with the eyetracker microvideo display. Audio output control systems, such as speech generators or synthesizers, are well known in the art. Such systems are commonly available on most computer systems. A speech generation unit could be used to generate voice prompts which may be used, for instance, to provide instructions to a user. For audio input, a voice or speech recognition unit may be used. For these purposes, the headband 12 of FIG. 1 may also support an earphone 14 and microphone 15. More than one earphone may be used if desired. The microphone 15 (FIG. 1) is preferably mounted in the housing 20 (FIG. 2) of the integrated unit 10. Many such audio input and output devices are available in the art and may be combined on a computer 18 in a manner well-known to those skilled in the art. This combination may also require some debugging of the application programs controlling the input and output devices as described above.

Using voice or speech recognition technology, a spoken word, or even a simple audio click, received by the computer 18 from microphone 15 is translated into intelligent computer commands. Most tasks require only a small vocabulary of input commands, regardless of the capacity of the voice recognition unit for input data. The voice or speech recognition unit also may be used to provide a system with a unique voice input stamp based on the operator's vocal patterns, to identify the user, thereby improving system security.

The selection of an appropriate voice recognition system depends on the application. A speaker dependent system is trained to recognize only a single operator's voice with a high percent of accuracy. A speaker independent system typically may recognize any person's voice, but with greater errors. Some systems also distinguish between discrete speech and continuous speech. Discrete speech isolates each word and requires a certain amount of pause between each spoken word in order for the computer to interpret it correctly. Continuous speech systems allow the speaker to speak more normally, without needing to pause between words. Other trade offs include speed, accuracy, capability and complexity, and vocabulary development.

A suitable, commercially-available product is Dragon Dictate, available from Dragon Systems of Newton, Mass. This system is capable of adapting to the speech of individual speakers, and learns to understand each individual. It also maintains personal speech pattern files for each user. Furthermore, it is capable of distinguishing between similar sounding words by applying English usage rules.

Flowcharts illustrating the operation of the eyetracker and voice recognition unit in connection with the computer 18 will now be described in connection with FIGS. 3–5.

Figure 3:
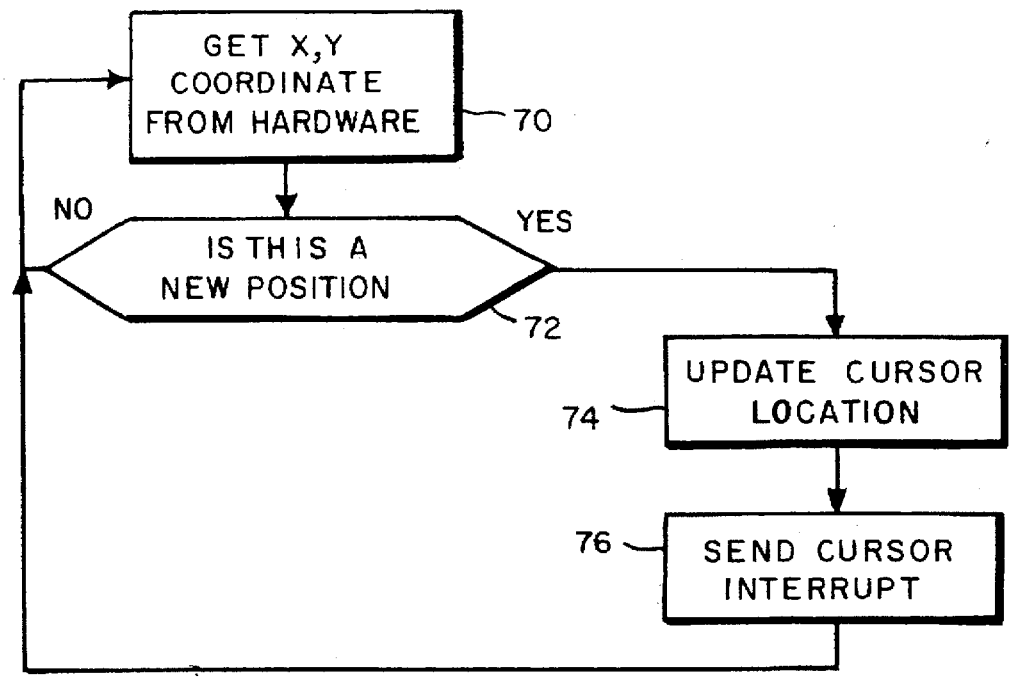
FIG. 3 is a flow chart describing the operation of an eyetracker driver.

FIG. 3 is a flowchart describing an eyetracker driver for the computer 18. The driver begins with step 70 of retrieving the X-Y coordinates provided by the eyetracker hardware. In Step 72, the new coordinates obtained in Step 70 are compared to the current coordinates. If the coordinates have not changed, the driver returns to Step 70. Otherwise, the coodinates indicate a new eye position and therefore new coordinate position, and the cursor location is updated in Step 74. An interrupt signal is then sent in Step 76. The interrupt is handled in a manner described below in connection with FIG. 5.

Figure 4:
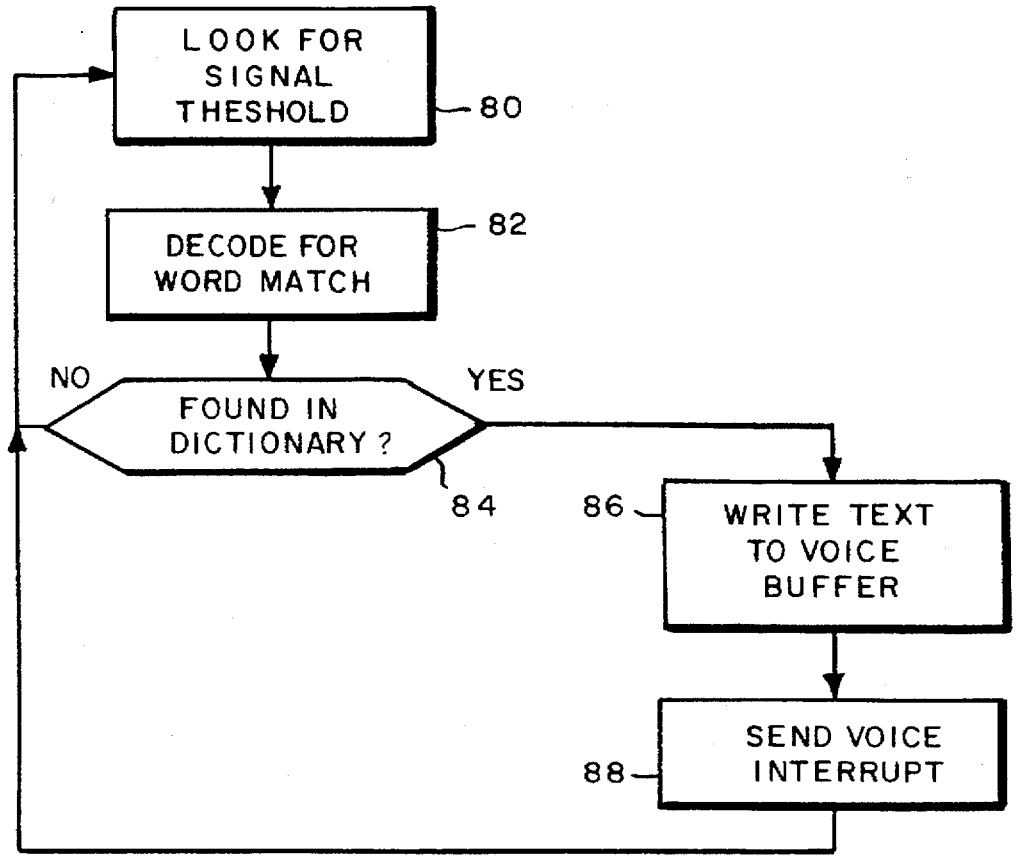
FIG. 4 is a flow chart describing the operation of a voice recognition unit driver.
Figure 5:
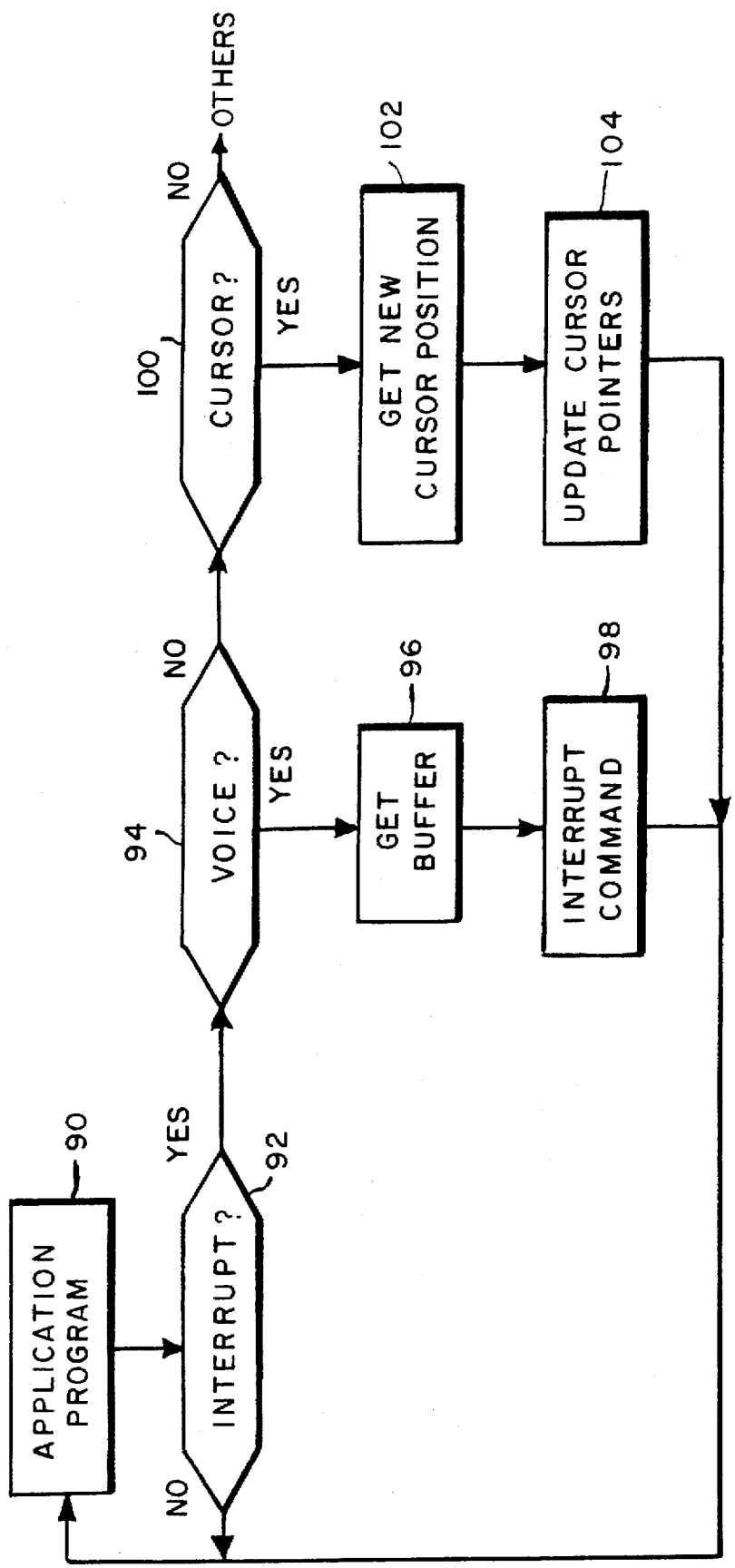
FIG. 5 is a flow chart describing how the operating system of a computer handles interrupts from the voice recognition unit and the eyetracker.

FIG. 4 is a flowchart illustrating the operation of a driver of a voice recognition unit. This driver is similar to a typical driver for a keyboard and provides interrupts similar to well-known keyboard interrupts. The driver begins with Step 80 of examining the signal for a level above a predetermined threshold indicating the start of audio input. This signal is then decoded in Step 82 to determine whether the voice signal indicates a word. If the determined word is not found in the system dictionary in Step 84, the driver looks again for a new signal threshold in Step 80. Otherwise, the voice signal indicates a word found in the dictionary, and that word is written to a buffer, which is similar to a keyboard buffer in well-known systems (Step 86). An interrupt signal is then sent in Step 88 to be handled by the operating system of computer 18.

Handling of interrupts by the operating system of computer 18 will now be described in connection with FIG. 5. Interrupt handling is a well-known process in computers. In general, an application program being run by a computer such as 18, and as indicated in Step 90, is interrupted by the operating system when the operating system receives interrupt signals from other processes and programs. The operating system then decides to process or to ignore those signals. The system steps through the known types of interrupts that it may receive to determine if the received interrupt should be handled. For example, the system may first determine whether a voice interrupt has been received in Step 94. If a voice interrupt has been received, the system retrieves the contents of the buffer in Step 96 and interprets those contents as a command in Step 98. After the command is executed, execution of the application program resumes with Step 90.

If the interrupt was determined not to be a voice interrupt in Step 94, it is next determined whether the interrupt signal indicates a new cursor position in Step 100. Upon receiving a cursor interrupt, the system obtains the new cursor position in Step 102 and updates the cursor pointers for the video display in Step 104. The execution of the application program then resumes in Step 90. An operating system typically may handle other interrupts which are not relevant to this discussion.

Beyond the advantage of providing complete portable computer interaction, the present invention also allows simultaneous multi-level computer input from a variety of sensory inputs, and also allows machine detection of user condition and actions. For example, the eyetracker allows the human eye to move a cursor on a screen in a manner similar to the way a mouse moves a cursor, except that the eye is faster. In practice, every mouse-guided cursor move is actually preceded by an eye fixation to locate the target, a forced gaze, and peripheral vision monitoring to observe the cursor moving across the screen and a final tracking maneuver to position the cursor at the target. These activities are eliminated by using an eyetracker instead of a mouse. When combined with voice input, a variety of commands may be provided for each selected cursor location, rather than a single selection command. Thus, the number of selections a user needs to make may be reduced.

The system of the present invention also allows machine detection of user condition and actions. It should be evident that, while the operator provide inputs to the system, the system observes the operator. For example, since eye motions are strongly connected to physical health, the eyetracker may determine if the operator is impaired due to illness, exhaustion, emotional distraction, drugs, etc. Also, such feedback could be used in training exercises. For example, if an operator was being trained in map reading, the system could determine if the operator is looking at the right features on the display, or even if the operator is looking in the right vicinity on the display. As another example, the voice patterns, detected by the voice recognition unit, and the eye image, obtained by the eyetracker, may also be used to verify the identity of the operator.

It should also be evident that the present invention may also be used in situations where standard computer interfaces may not be used. For example, when an operator is physically handicapped, but still has use of his voice and eyes, the present invention may be used to provide an interface for them to a computer.

The computation hardware, due to its small size for the eyetracker and voice recognition units could be provided in a small portable package in connection with the head mounted unit which communicates with a remote computer. Such a system is shown schematically in FIG. 6.

The portable unit 40 may include the computation hardware elements which are typically used for the speech generation unit 42 (for use in providing voice prompts to the user), the voice recognition unit 44, the microvideo display unit 46 and the eyetracker unit 48. The operation of these units and communication with the computer 18 is controlled by the microprocessor 50 and radio transceiver 52. The microprocessor is merely used to route data between the computer 18, a memory 54 and the hardware units 42–48. The portable unit 40 may be powered by a battery 56. The computer 18 also has a corresponding radio transreceiver (not shown) for communication with this portable unit.

Other input devices could also be combined with the eyetracker microvideo display unit. Such devices include oscilloscope probes, pressure sensors, temperature sensors, bar code readers and other types of specialized sensory probes. These probes could be used to provide further input data to the computer. This optional input device may also be attached to the portable unit 50 as shown at 58 in FIGS. 1 and 6 to provide data to the computer 18.

The present invention could also be made using two eyetracking devices which would allow for three-dimensional graphic displays and depth perception in eyetracking.

Having now provided a detailed description of the present invention, it should be apparent to those skilled in the art that the foregoing is illustrative only and not limiting, having been presented by way of example only. Numerous other embodiments and modifications thereof are contemplated as falling within the scope of the present invention as defined by the appended claims and equivalents thereto.

What is claimed is:

1. A hands free, sensory integrated data interface for interacting with a computer, said interface comprising:

a headset to be worn by a user;

means for interacting with said user attached to said headset, said interacting means communicating with said computer;

said interacting means comprising a microvisual display monitor mounted to said headset and positionable in front of a user's eye;

said microvisual display monitor receiving information to be displayed from said computer;

said interacting means further comprising means for tracking the position of said user's eye and for identifying that portion of said displayed information upon which said user's eye is focused and means for transmitting commands to said computer based upon that portion of said displayed information upon which said user's eye is focused;

said interacting means further comprising first means attached to said headset for receiving an oral command from said user and for transmitting said oral command to said computer via said transmitting means;

said computer being programmed to perform at least one function in response to said oral command;

an earphone attached to said headset; and said computer having means for generating synthesized voice prompts for said user and for transmitting said voice prompts to said earphone via said transmitting means.

2. The hands free interface of claim 1 wherein:

said tracking means comprises an eye tracker which includes means for obtaining an image of the user's eye and means for determining a position on the microvideo display monitor where the user's eye is focused; and said image obtaining means being arranged in a fixed spatial relationship with said microvisual display monitor, whereby said user's eye may be used to control the position of a cursor displayed on said monitor.

3. The hands free interface of claim 2 wherein said determining means comprises means for determining a duration of time during which the user's eye is directed at said position on said microvideo display monitor and means for generating said commands if said duration exceeds a predetermined threshold.

4. The hands free interface of claim 1 wherein said computer has a second means for receiving said oral command and means for automatically identifying said user from said received oral command.

5. The hands free interface of claim 2 wherein said computer includes means for automatically identifying said user from said image of said user's eye.

6. The hands free interface of claim 1 wherein said computer includes means for automatically determining if the user is impaired.

7. The hands free interface of claim 1 wherein said computer is at a location remote from the user and said transmitting means includes a transceiver for bilateral communication with the computer.

8. The hands free interface of claim 1 further comprising:

a housing mounted to said headset;

said housing enclosing said microvisual display monitor, said eye position tracking means and said first means for receiving said oral command; and said housing maintaining a fixed spatial relationship between the microvisual display monitor and the eye position tracking means.

9. The hands free interface of claim 8 wherein said eye position tracking means comprises an infrared illuminator for illuminating the user's eye, a video chip for sending signals to said transmitting means, and a lens for focusing reflections from the user's eye into the video chip.

10. The hands free interface of claim 8 wherein said housing supports a dichroic mirror which allows the user to look directly at the microvisual display monitor without interference from the eye position tracking means.

11. The hands free interface of claim 10 wherein said housing supports a lens between said dichroic mirror and said microvisual display monitor in order to enhance the picture obtained by said monitor.

12. The hands free interface of claim 1 further comprising means for calibrating and placing said microvisual display monitor and said eye position tracking means into a fixed spatial relationship by calibrating the eye position tracking means with an X-Y coordinate system of said display monitor and for maintaining said display monitor and said eye position tracking means in said fixed spatial relationship.

13. The hands free interface of claim 12 wherein said calibrating and placing means comprises means for displaying at least two points on said display monitor and for instructing the user to look at said points.

14. The hands free interface of claim 1 wherein said microvisual display monitor displays said information as a single image.

* * * * *

UNITED STATES PATENT AND TRADEMARK OFFICE
CERTIFICATE OF CORRECTION

PATENT NO. : 5,751,260

DATED : May 12, 1998

INVENTOR(S) : Bruce Nappi, et al.

It is certified that error appears in the above-identified patent and that said Letters Patent is hereby corrected as shown below:

Column 1, after line 4, insert the following:

<u>Statement of Government Interest</u>
The invention described herein may be manufactured and used by or for the government of the United States of America for government purpose without the payment of any royalties thereon or therefor.

Signed and Sealed this

Ninth Day of February, 1999

Attest:

Attesting Officer

*Acting Commissioner of Patents and Trademarks*